No. 653,745. Patented July 17, 1900.
W. M. JEWELL.
METHOD OF MAKING REAGENTS FOR PURIFYING WATER.
(Application filed Aug. 17, 1899.)
(No Model.)
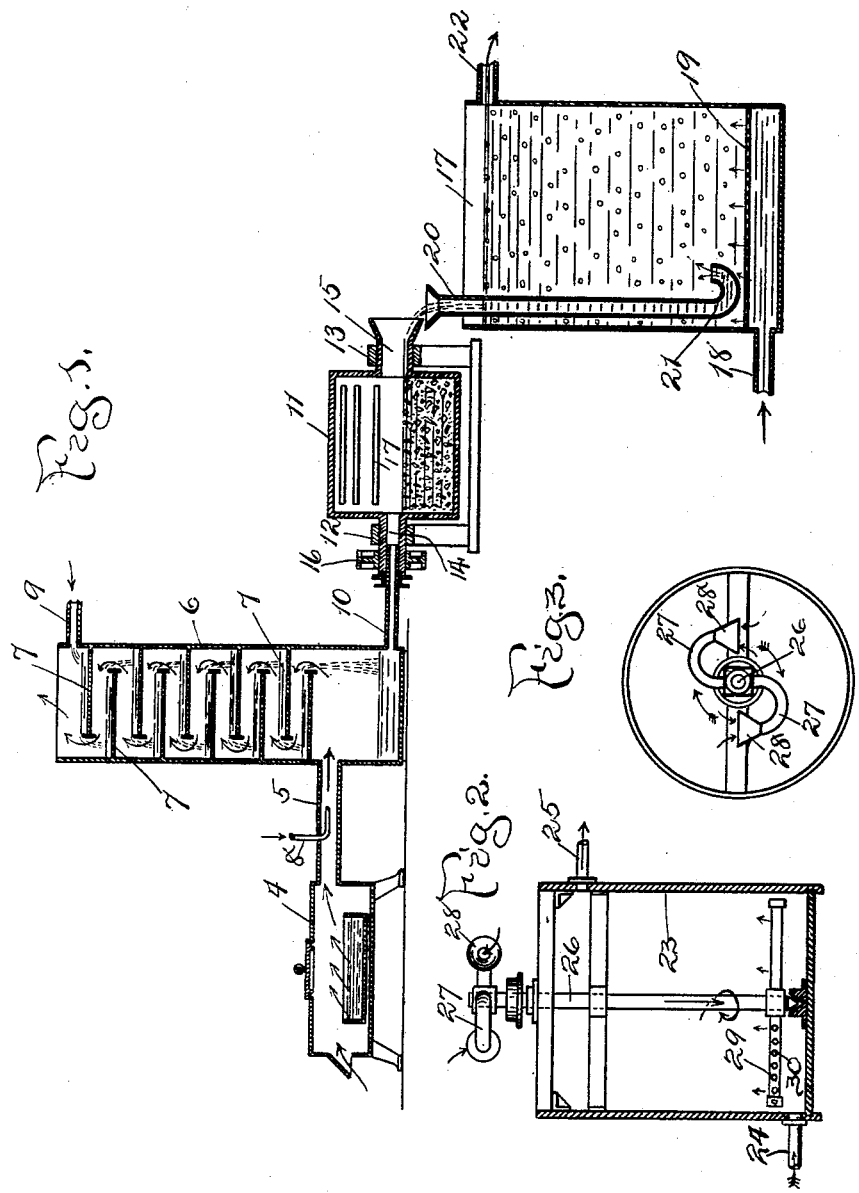
Witnesses
Inventor
William M. Jewell.
By his Attorneys

UNITED STATES PATENT OFFICE.

WILLIAM M. JEWELL, OF CHICAGO, ILLINOIS.

METHOD OF MAKING REAGENTS FOR PURIFYING WATER.

SPECIFICATION forming part of Letters Patent No. 653,745, dated July 17, 1900.

Application filed August 17, 1899. Serial No. 727,543. (No specimens.)

*To all whom it may concern:*

Be it known that I, WILLIAM M. JEWELL, a citizen of the United States, residing at Chicago, in the county of Cook and State of Illinois, have invented a certain new and Improved Method of Producing a Purifying Reagent, of which the following is a specification, reference being had to the accompanying drawings.

My invention relates to the production of chemical compounds, and has for one object to provide an improved method of producing a purifying reagent particularly adapted for use in purifying water.

A further object is to provide an improved process for producing persulphate of iron.

I accomplish these results as hereinafter described.

What I regard as new will be set forth in the claims.

In the accompanying drawings, Figure 1 is a longitudinal section of a system of apparatus for producing a purifying reagent according to my improved process. Fig. 2 is a vertical section of a modification of the aerating apparatus, and Fig. 3 is a plan view of the parts shown in Fig. 2.

Generally stated, my improved process consists in producing ferrous bisulphite in solution and oxidizing it by subjecting it to the action of free oxygen while in solution, converting it at once into ferric sulphate, which constitutes a valuable purifying reagent for use in purifying sewage, as well as for purifying water for potable purposes. The solution before oxidation may also be used as a purifying reagent, as has been set forth in my former application for patent, Serial No. 695,709, filed November 7, 1898.

In carrying out my improved process the solution of ferrous bisulphite is derived by generating sulphurous-acid gas by the combustion of sulphur and subjecting such gas to the action of water, forming sulphurous acid, which is then conducted to a bed of iron preferably in the form of scrap or a suitable compound of iron or its equivalent, the action of the sulphurous acid upon the iron producing the ferrous bisulphite in solution. The oxidation of this product to produce the ferric sulphate is effected by subjecting the solution to the action of air, which is introduced into the solution and disseminated throughout it, thereby subjecting the entire body of the solution of bisulphite to the action of the oxygen of the air, causing its oxidation and producing ferric sulphate. The production of the ferrous bisulphite and its oxidation may be effected in various ways and by the use of different forms of apparatus; but in the drawings I have shown the form of apparatus which I consider to be the most effective for the purpose. It consists of a retort 4, adapted to contain sulphur, from which the sulphurous-acid gas is produced, which retort communicates by a pipe 5 with a reservoir 6, having a series of horizontal partitions 7 arranged to present a sinuous channel, through which the gas passes toward the top of the reservoir, where the surplus gas escapes. The pipe 5 opens into the lower part of the reservoir 6, as shown in the drawings, and contains a steam-pipe 8, which discharges steam into the pipe 5 in a direction toward the reservoir 6, thereby causing the gas generated in the retort to flow into and through said reservoir.

9 indicates a water-pipe which discharges into the upper end of the reservoir 6, so that the water flows in a sinuous course over the partitions 7 and is consequently subjected for a considerable length of time to the action of the upward-flowing gas, becoming impregnated with the gas, forming sulphurous acid. The sulphurous acid formed in the reservoir 6 is discharged therefrom through a pipe 10, communicating with the lower end thereof and communicating with a drum 11, which is mounted in suitable bearings 12 and 13, said drum having hollow trunnions 14 and 15, as shown in Fig. 1. The pipe 10 enters the trunnion 14, so that the sulphurous acid is discharged into the drum 11, which is partially filled with scrap-iron. Said drum 11 is revolved by suitable mechanism, being provided with a pulley 16, mounted upon one of the trunnions, as 14, and the drum is preferably provided with a series of longitudinal strips 17 on its inner face in order to agitate the scrap-iron as the drum rotates. The action of the sulphurous acid on the scrap-iron results in the production of ferrous bisulphite in solution, said solution being discharged from said drum through the trunnion 15, as shown in Fig. 1.

17 indicates an aerating-tank which is arranged below the trunnion 15 and is provided at its lower end with an air-pipe 18, through which air is introduced into it. The tank 17 also has a perforated plate 19 near the bottom, arranged in a horizontal position, through which the air enters the tank, said plate serving to distribute the air over the bottom of the tank.

20 indicates a pipe which is preferably arranged in the tank 17, and extends to near the bottom thereof, and is provided with an upturned end 21, which forms a trap to prevent the rising air in the tank 17 from entering said pipe. The pipe 20 receives the solution of ferrous bisulphite from the drum 11 and conducts it to near the bottom of the tank 17, into which it is discharged in an upward direction and at once subjected to the action of the air introduced through pipe 18, the oxygen of the air oxidizing it and forming ferric sulphate.

22 indicates an outlet-pipe, which communicates with the upper portion of the tank 17 and serves to conduct the liquid and the persulphate of iron from said tank.

In Figs. 2 and 3 I have shown another form of apparatus for oxidizing the solution of ferrous bisulphite. Such apparatus consists of a tank 23, into the lower portion of which the solution is introduced through a pipe 24. It is discharged therefrom through a pipe 25 at the upper end of the tank 23. The aeration is accomplished by means of a rotating tube 26, mounted in suitable bearings in tank 23 and carrying at its upper end one or more horizontal pipes 27, having at their inner ends communication with the pipe 26 and at their outer ends provided with funnels 28, the openings of which are arranged radially. This is best accomplished by curving the pipes 27, as illustrated in Fig. 3. At the lower end of the pipe 26 is a horizontal arm 29, extending across the tank and having perforations 30, the perforations at the opposite sides of the pipe 26 being arranged to discharge in opposite directions. The result of this construction is that when the pipe 26 is rotated rapidly in the direction indicated by the arrow in Figs. 2 and 3 air is caused to pass into the funnels 28 and is then carried down through the pipe 26 and discharged into the lower portion of the tank 23. By locating the perforations as shown the passage of the pipe 29 through the solution relieves the perforations of considerable pressure and facilitates the discharge of the air. The air discharged into the tank rises through the solution and effectually aerates it, the result being the production of ferric sulphate, as already described.

The apparatus above described is not herein claimed, as it forms the subject-matter of another application for patent filed August 25, 1899, Serial No. 728,447, my present application having solely to do with the process described.

I have used the term "iron" in referring to the substance acted on by the sulphurous acid; but it should be understood that such term includes other equivalent substances which may be substituted for it to produce substantially the same result.

That which I claim as my invention, and desire to secure by Letters Patent, is—

1. The method of producing a purifying reagent, which consists in subjecting water to the action of sulphurous-acid gas, passing the solution so formed over iron, and converting the resulting solution into ferric sulphate by oxidation, substantially as described.

2. The method of producing a purifying reagent which consists in bringing sulphurous-acid gas in water into contact with iron, and subjecting the resulting solution of the metallic salt to the action of free oxygen, substantially as described.

3. The method of forming ferric sulphate which consists in aerating a solution obtained by bringing sulphurous-acid gas in water into contact with iron, substantially as described.

4. The method of forming ferric sulphate, which consists in generating sulphurous-acid gas, conducting it into water, passing the resulting sulphurous acid over iron, and oxidizing the solution thereby produced by subjecting it to the action of oxygen, substantially as described.

5. The method of forming ferric sulphate, which consists in introducing free oxygen into a solution of ferrous bisulphite, substantially as described.

WILLIAM M. JEWELL.

Witnesses:
JOHN L. JACKSON,
ALBERT H. ADAMS.